US007676505B2

(12) United States Patent
Chess et al.

(10) Patent No.: US 7,676,505 B2
(45) Date of Patent: Mar. 9, 2010

(54) SYSTEM, METHOD AND COMPUTER PROGRAM PRODUCT FOR SHARED USER TAILORING OF WEBSITES

(75) Inventors: David M Chess, Mohegan Lake, NY (US); Alla Segal, Mount Kisco, NY (US); Ian Nicholas Whalley, Pawling, NY (US); Jian Yin, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 11/340,968

(22) Filed: Jan. 27, 2006

(65) Prior Publication Data

US 2007/0185927 A1    Aug. 9, 2007

(51) Int. Cl.
*G06F 12/00* (2006.01)
*G06F 17/30* (2006.01)

(52) U.S. Cl. ............... 707/203; 707/201; 707/104.1; 707/1

(58) Field of Classification Search ........... 707/201
See application file for complete search history.

(56) References Cited

U.S. PATENT DOCUMENTS

| 5,930,801 | A  | * | 7/1999  | Falkenhainer et al. ... | 707/103 R |
| 6,009,442 | A  | * | 12/1999 | Chen et al. ............... | 715/205 |
| 6,185,587 | B1 | * | 2/2001  | Bernardo et al. ........ | 715/234 |
| 6,199,067 | B1 | * | 3/2001  | Geller ...................... | 707/10 |
| 6,240,444 | B1 | * | 5/2001  | Fin et al. ................. | 709/205 |
| 6,546,388 | B1 | * | 4/2003  | Edlund et al. ............ | 707/5 |
| 6,665,838 | B1 | * | 12/2003 | Brown et al. ............ | 715/205 |
| 6,691,106 | B1 | * | 2/2004  | Sathyanarayan ......... | 707/3 |
| 6,845,374 | B1 | * | 1/2005  | Oliver et al. ............. | 707/5 |
| 7,054,900 | B1 | * | 5/2006  | Goldston ................. | 709/203 |
| 7,092,936 | B1 | * | 8/2006  | Alonso et al. ............ | 707/3 |
| 7,171,414 | B1 | * | 1/2007  | Nazem et al. ............ | 707/10 |
| 2002/0046245 | A1 |   | 4/2002  | Hillar et al. .............. | 709/205 |
| 2002/0065877 | A1 |   | 5/2002  | Kowtko et al. ........... | 709/203 |
| 2002/0073125 | A1 |   | 6/2002  | Bier ......................... | 707/530 |
| 2002/0091721 | A1 | * | 7/2002  | Mcbride et al. .......... | 707/203 |
| 2002/0103856 | A1 |   | 8/2002  | Hewett et al. ............ | 709/203 |

(Continued)

OTHER PUBLICATIONS

LiveJournal.com, http://web.archive.org/web/20020222232240/http://www.livejournal.com/, archived, Feb. 22, 2002, 2 pp.*

(Continued)

*Primary Examiner*—James Trujillo
*Assistant Examiner*—Marc Somers
(74) *Attorney, Agent, or Firm*—Harrington & Smith, PC

(57) ABSTRACT

Users create, share, and build collaboration communities around tailored versions of the functional pages of a web site, such as the pages used to select and purchase products, or the pages used to present course materials in an online-learning site. The tailored versions of the web site are stored at the common web site development web site or at another server side location. Users access the tailored versions to select a tailored version for their own use and/or modification.

13 Claims, 10 Drawing Sheets

U.S. PATENT DOCUMENTS

| | | | |
|---|---|---|---|
| 2003/0065638 A1 | 4/2003 | Robert | 707/1 |
| 2003/0140038 A1* | 7/2003 | Baker et al. | 707/3 |
| 2004/0039795 A1* | 2/2004 | Percival | 709/218 |
| 2004/0268228 A1 | 12/2004 | Croney et al. | 715/505 |
| 2006/0031147 A1* | 2/2006 | Bell et al. | 705/27 |

OTHER PUBLICATIONS

LiveJournal.com Interests, http://web.archive.org/web/20020222232811/www.livejournal.com/interests.bml, archived, Feb. 22, 2002, 1 pp.*

LiveJournal.com FAQ, http://web.archive.org/web/20020222232937/www.livejournal.com/support/faq.bml, archived, Feb. 22, 2002, 4 pp.*

LiveJournal.com FAQ About LiveJournal, http://web.archive.org/web/20020223075129/www.livejournatcom/support/faqbrowse.bml?faqcat=about, archived, Feb. 23, 2002, 5 pp.*

LiveJournal.com Comments, http://web.archive.org/web/20020223052149/www.livejournal.com/support/faqbrowse.bml?faqcat=comments, archived, Feb. 23, 2002, 4 pp.*

LiveJournal.com About Paid Accounts, http://web.archive.org/web/20020222232825/www.livejournal.com/paidaccounts/, archived, Feb. 22, 2002, 3 pp.*

LiveJournal.com Accounts, http://web.archive.org/web/20040404113901/www.livejournal.com/support/faqbrowse.bml?faqcat=accounts, archived, Apr. 4, 2004, 11 pp.*

LiveJournal.com FAQ Question #131, http://web.archive.org/web/20031229023848/www.livejournal.com/support/faqbrowse.bml?faqid=131, archived, Dec. 29, 2003, 3 pp.*

LiveJournal.com FAQ Communications, http://web.archive.org/web/20020220103958/www.livejournal.com/support/faqbrowse.bml?faqcat=communication, archived, Feb. 20, 2002, 4 pp.*

LiveJournal.com FAQ Topic Directory, http://web.archive.org/web/20020223083136/www.livejournal.com/support/faqbrowse.bml?faqcat=topic, archived, Feb. 23, 2002, 3 pp.*

LiveJournal.com FAQ Communities, http://web.archive.org/web/20020223083148/www.livejournal.com/support/faqbrowse.bml?faqcat=community, archived, Feb. 23, 2002, 8 pp.*

LiveJournal.com FAQ Customization, http://web.archive.org/web/20020220102555/www.livejournal.com/support/faqbrowse.bml?faqcat=customize, archived, Feb. 20, 2002, 9 pp.*

Bates et al, "SharePoint 2003 User's Guide", Springer-Verlag, New York, 2005, 87 pp.*

"Corporate Collaboration With TWiki", Peter Thoeny, Dec. 9, 2005, pp. 1-7.

"The Anatomy of a Large-Scale Hypertextual Web Search Engine", Sergey Brin et al., Dec. 9, 2005, pp. 1-19.

* cited by examiner

AVAILABLE VERSIONS OF THIS WEBSITE

HERE ARE ALL THE TAILORED VERSIONS OF THIS SITE THAT AcmeCorp AND YOUR FELLOW USERS HAVE DESIGNED AND MADE AVAILABLE FOR YOUR USE. PLEASE BROWSE THROUGH THEM, AND PICK THE ONE THAT WILL MAKE THE SITE MOST USEFUL TO YOU.

⌐301

| SORT BY MOST RECENT | SORT BY MOST POPULAR | SORT BY RECOMMENDED |

⌐302

| VERSION | AUTHOR | TYPE | RATINGS | AVERAGE RATING | LAST MODIFIED |
|---|---|---|---|---|---|
| BARGAIN HUNTER | JRSmith | PRICE-BASED | 12 | 4.9 | 2005 AUGUST 11 |
| RED BARON | TiffanyK | POWER-USER | 26 | 4.87 | 2005 MARCH 22 |
| ESSENTIALS | JordanKatz | COMPACT | 7 | 4.81 | 2005 AUGUST 15 |
| CHEAPSKATE | Saki | PRICE-BASED | 49 | 4.75 | 2005 JANUARY 8 |

DETAILS FOR THE "ESSENTIALS" VERSION OF THE SITE

THIS PAGE DESCRIBES THE "ESSENTIALS" VERSION OF THIS SITE. HERE, YOU CAN SELECT THE VERSION AND GIVE IT A TRY, SEND FEEDBACK TO THE AUTHOR OF THE VERSION, RATE IT BASED ON YOUR EXPERIENCE, OR GO TO THE FORUM WHERE THIS VERSION IS DISCUSSED.

VERSION: ESSENTIALS
AUTHOR: JordanKatz
TYPE: COMPACT
RATINGS: 7
AVERAGE: 4.81
DESCRIPTION: THE BARE ESSENTIALS! LOADS FAST, MINIMAL GRAPHICS, EASY ON THE EYES. ALL THE SITE FUNCTION ON JUST THREE PAGES!

TRY THIS VERSION — 401
RATE IT: ☐ 1-POOR  ☐ 2-FAIR  ☐ 3-GOOD  ☐ 4-VERY GOOD  ☐ 5-GREAT — 402
GO TO FORUM (6 NEW OF 36 POSTINGS) — 403

FIG.4

TAILORING TASKS

THIS PAGE ALLOWS YOU TO PERFORM THE BASIC TASKS WITH CREATING A TAILORED VERSION OF THIS WEB SITE. ONCE YOU'VE CREATED YOUR OWN VERSION OF THE SITE, YOU CAN USE IT YOURSELF, AND SHARE IT WITH THE COMMUNITY.

BEGIN CREATING A NEW VERSION OF THE SITE: THE FIRST STEP. BEGINNING A NEW VERSION OF THE SITE ENABLES ALL THE OTHER TASKS.

DEFINE AND MODIFY PAGES: HERE, YOU CAN DEFINE NEW PAGES FOR A VERSION OF THE SITE, AND MODIFY PAGES THAT YOU HAVE ALREADY DEFINED.

DEFINE AND MODIFY PORTLETS: HERE, YOU CAN DEFINE NEW PORTLETS FOR A VERSION OF THE SITE, AND MODIFY PORTLETS THAT YOU HAVE ALREADY DEFINED. PORTLETS ARE INDIVIDUAL DESIGN AND FUNCTIONAL ELEMENTS THAT YOU CAN USE ON THE PAGES OF ANY VERSIONS OF THE WEB SITE THAT YOU CREATE.

WORK WITH STYLESHEETS: HERE, YOU CAN DEFINE AND MODIFY CSS (CASCADING STYLE SHEETS) THAT DETERMINE WHAT YOUR VERSION OF THE SITE LOOKS LIKE TO PEOPLE WHO USE IT.

FIG.5

SYSTEM, METHOD AND COMPUTER PROGRAM PRODUCT FOR SHARED USER TAILORING OF WEBSITES

FIELD OF THE INVENTION

This invention relates to web site design and development and, more particularly, to a method and system for allowing collaborative development of web sites.

BACKGROUND OF THE INVENTION

The design and implementation of web sites, in particular complex web sites intended for use by large numbers of users such as mainstream commercial and business web sites, is a complicated and costly process. Because people differ in their tastes, skill levels, and habits, only a fraction of potential users may prefer a given web site design when multiple web site design choices are made available. For example, a simple web site design may be preferred by newcomers, but found to be frustrating to use by experienced users. Or, an extremely visual design may be ideal for users with visual cognitive styles but difficult to use for those with limited vision or with narrative cognitive styles. Known solutions to the problem of varied user characteristics include offering multiple specially-created versions of the web site (at a correspondingly multiplied cost in design and implementation), and allowing users to personalize or customize the visual appearance of the site for themselves and then to store the customized designs on their personal computers (i.e., on the client side of the web). But since most users are not interested in becoming web-site designers and because visual appearance is only one part of the overall site experience, those solutions are of limited benefit.

Low-cost solutions to other Net related and Web related information design problems have been achieved by leveraging user-created design or organizational information. The Google™ search engine, for instance, rather than using a specifically-organized hierarchy of web pages by subject (as attempted by the Yahoo!® and dmoz systems), allows the logical structure of the Web to emerge from the links that page authors create between pages (S. Brin and L. Page, "The anatomy of a large-scale hypertextual Web search engine," In Proceedings of the 7th World Wide Web Conference, pages 107-117, 1998). The flickr online photo-sharing community uses user-entered "tags" rather than a pre-designed set of categories to allow users to structure the photographs on the site. Various portal sites, such as "Yahoo!®" and "My AOL™", allow each user to create a personalized "portal" page for which the user selects the set of information items that the page may contain (from a list of preset available items), and selects some aspects of the page's appearance (such as the ordering or placement of the information items, the background color used, and the like); this portal page is presented to the user each time he enters the site. Several existing publications describe mechanisms for site owners to change the content or appearance of their web site, or to allow site users to customize the visual appearance of a page for their own use (see, for instance, Percival—US Published Patent Application No. 2004/0039795, Hewett—US Published Patent Application No. 2002/0103856, Croney—US Published Patent Application No. 2004/0268228, Kowtko—US Published Patent Application No. 2002/0065877, Bier—US Published Patent Application No. 2002/0073125, Hillar—US Published Patent Application No. 2002/0046245, and Robert—US Published Patent Application No. 2003/0065638), or to allow site users to add content to the site (as in "Wiki" style systems; see for instance "Corporate Collaboration with TWiki", WEB Techniques, v. 5, n. 12, pp. 51-55, December 2000). Some of these known methods include allowing the export in other formats of site content (as in many Wiki-style systems) or of user customization properties (as in Croney—US Published Patent Application No. 2004/0268228). But none of these solutions allow users to create, share, and build collaboration communities around tailored versions of the functional pages of a web site (such as the pages used to select and purchase products, or the pages used to present course materials in an online-learning site).

Other solutions have been of limited scope. Various computer programs such as the WinAmp™ media player and the Mozilla™ web browser allow the user to create and apply "skins" and "plugins" to change the appearance and function of the program, thus effectively offloading some aspects of the program's design onto the user community. This type of "skinning", however, applies to individual computer programs rather than to web sites. Web browser accessories such as the "Greasemonkey" program for the Mozilla™ web browser allow the user to alter the data that is received from a web site, in order to change the user's experience of the site as viewed through the browser. But because Greasemonkey scripts are stored and applied at the client side, they are negatively impacted by changes to the server-side design of the site (and are therefore much less reliable than tailoring done at the server side), and they are not under the control of the owners of the site.

Thus, there is a need for a system and method of providing tailored web site versions to a requesting user in accordance with one or more criteria, including the web site design skill level of the requesting user.

SUMMARY OF THE INVENTION

In a first non-limiting aspect of the present invention, there is provided a system for allowing shared user tailoring of web sites comprises a mechanism for a plurality of site users to create or modify tailored versions of the website, the tailoring comprising one or more of modifications: to the set of pages that appear on the web site, to the appearance of a plurality of pages on the web site, and to the function of a plurality of pages on the web site.

In a second non-limiting aspect of the present invention, there is provided a method for implementing a web site, comprising presenting a plurality of web site implementation options to a user, wherein at least one of the plurality of web site implementation options includes at least one filter; upon the user selecting the at least one filter, applying the at least one filter to provide the subset of the plurality of tailored versions of a web site; selecting one of the tailored versions of the web site; and implementing the selected tailored version of the web site by allowing the user at least one of using the web site and modifying the web site.

In a third non-limiting aspect of the present invention, there is provided a signal bearing medium tangibly embodying a program of machine-readable instructions executable by a digital processing apparatus to perform operations to allow a user to create, modify and use tailored versions of a web site, the operations comprising determining if a user has selected a tailored version of a web site; if it is determined that the user has selected a tailored version of a web site, loading selected elements of the tailored version; if it is determined that the user has not selected a tailored version of a web site, loading default tailored elements; generating at least one web page dynamically using the loaded elements.

BRIEF DESCRIPTION OF THE DRAWINGS

Further aspects of the instant invention may be more readily appreciated upon review of the detailed description of the embodiments included below when taken in conjunction with the accompanying drawings, of which:

FIG. 3 is an embodiment of an exemplary web page fragment to present a user with a list of available tailored versions;

FIG. 4 is an embodiment of an exemplary web page fragment to present a user with information and other functions relating to a particular tailored version of a web site;

FIG. 5 is an embodiment of a exemplary web page fragment to allow a user to create and modify tailored versions of the web site;

DETAILED DESCRIPTION

The exemplary embodiments of this invention allow a user to create, share, and build collaboration communities by sharing tailored versions of the visual and functional pages of a web site (such as the pages used to select and purchase products, or the pages used to present course materials in an online-learning site). The exemplary embodiments of this invention may be used with an open source community as an example of leveraging a large community of users and volunteer developers to economically develop a web site. Users may create their own tailored versions of the entire site, encompassing both visual experience (such as graphical user interfaces—GUIs) and functional organization, and share those tailored versions with each other and with users who are not themselves interested in doing their own customization. This effectively offloads some of the work of web site design onto the user community, leading to a number of advantages. Since the tailored versions of the web site are designed by users, they reflect the actual needs of at least some real users, rather than reflecting the often inaccurate assumptions about user needs made by the site owners or professional designers. Because new tailored versions may be created at any time, the available versions of the site may also track changes in user needs or preferences. As users create the tailored versions for themselves and for each other, and then share them with potentially many other users, a large number of designs may be made available at little or no additional cost per design. And, the activity of creating and sharing versions of the web site design, and the social interaction that the activity affords, may increase the users temporal and/or financial investment in the web site. The present invention allows web site owners to leverage the user community to improve the design of their web sites. Another advantage of the present invention is that it allows web site designers to share their designs with others, and to use their design skills on web sites that they do not themselves own or control.

The accompanying diagrams illustrate exemplary embodiments of this invention.

The term "mechanism," as used throughout this specification, refers to software code, firmware code, a process, a hardware element, a software element, a firmware element, an apparatus, a device, a software program, a software subroutine, a special purpose circuit, a general purpose circuit, or any combination of these. For example, a mechanism may be a set of software modules under the control of a main software program resident on the server.

The term "web site," as used throughout this specification, refers to a group of web pages in which one or more web pages of the group may have hyperlinks to other web pages of the group in which the group of web pages is maintained and made accessible by an individual or an entity such as a company, educational institution, government, etc.

Figure 1A:
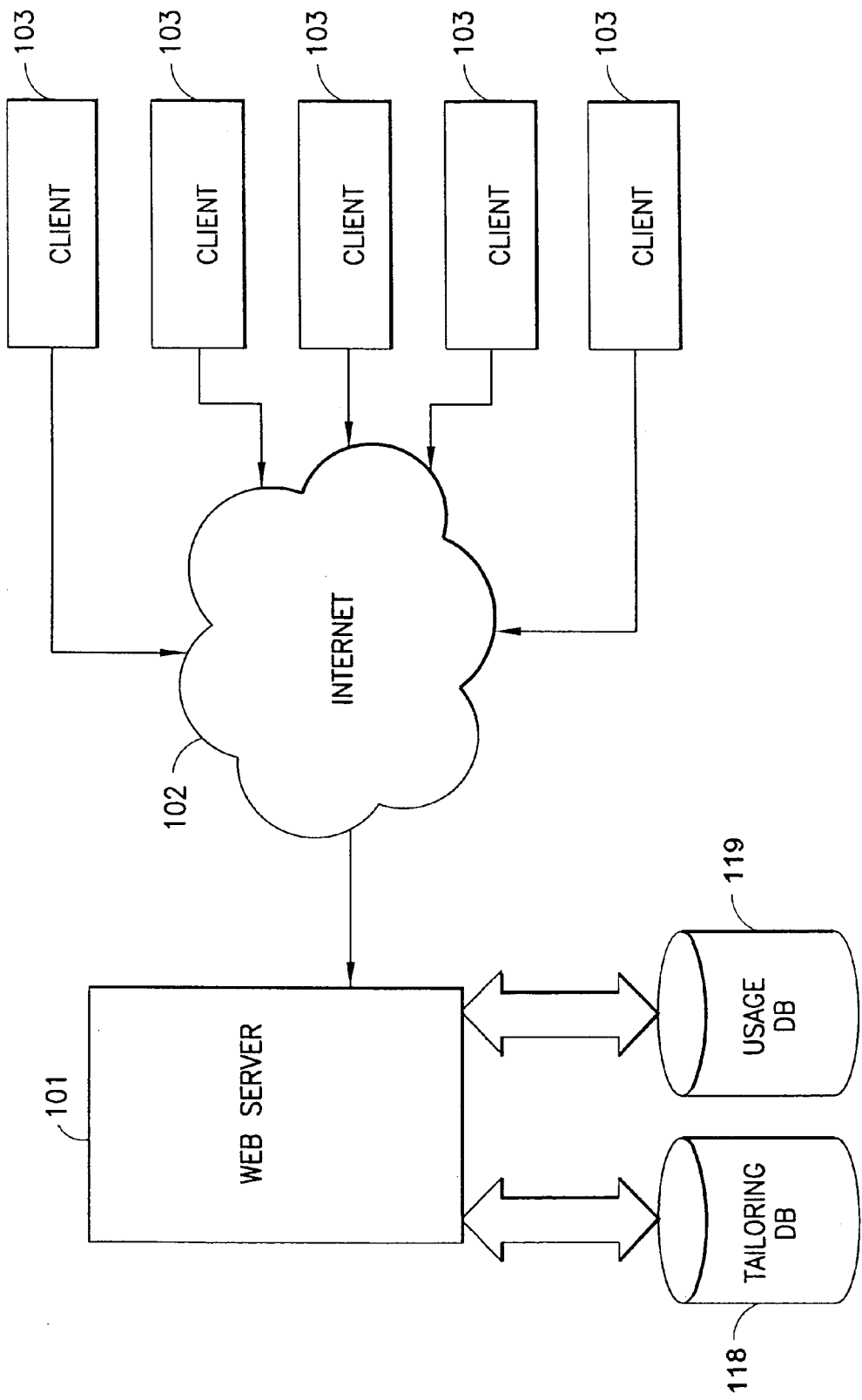
FIG. 1A is a block diagram of an embodiment of a system of the present invention.

FIG. 1A is a block diagram of a system embodying this invention: a web server 101 communicates via the Internet 102 typically with a plurality of client computers 103 used by users and administrators of the system, in order to allow them to interact with the hosted web site. A user may be presented with web site implementation options from which to choose to allow him or her to select and then tailor and/or use a web site. The web server 101 is also coupled to a server side tailoring database DB 118 containing descriptions of tailored versions of the web site, and a server-side usage database DB 119 containing data on the past usage patterns of the web site by various users, and may also include expressed preferences of those users. The tailored website versions created, modified, accessed, and used may be versions of a plurality of web sites, rather than only a single web site, in which case, one server may control multiple web sites or multiple servers may control multiple web sites. In order to maintain quality control of the tailored web sites and facilitate the development of a collaboration community around customized or tailored versions of the functional pages of the web site, tailored versions are preferably stored in server side storage, such as a computer readable medium (e.g., disk, tape, and/or semiconductor memory) or other signal bearing medium tangibly embodying a program of machine-readable instructions executable by a processor to perform operations to allow a user to create, modify and use tailored versions of the web site.

Figure 1B:
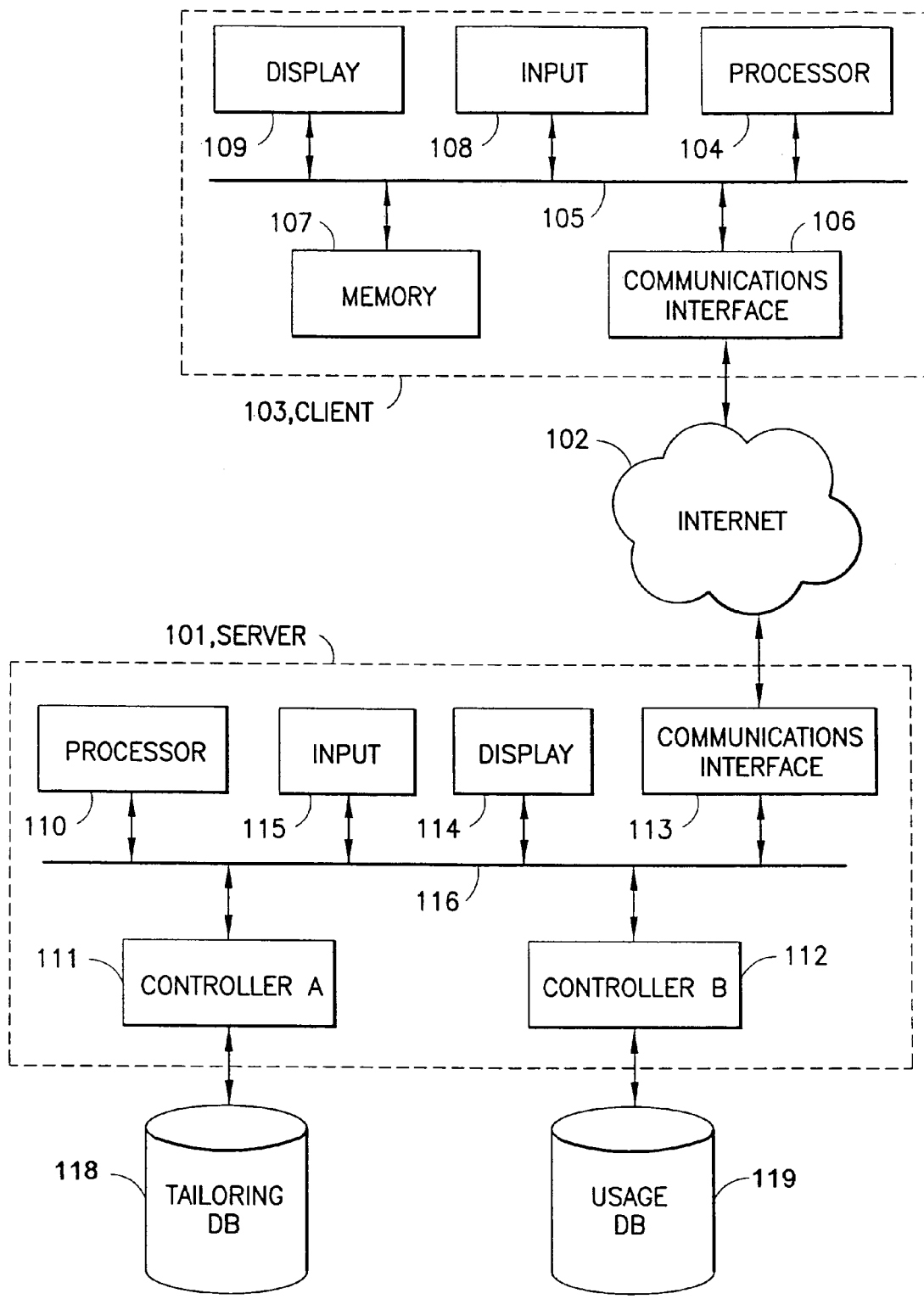
FIG. 1B is a block diagram of another embodiment of a system of the present invention.

FIG. 1B is a block diagram of another embodiment of a system of the present invention in which the client 103 and server 101 of FIG. 1A are shown in greater detail in an exemplary, non-limiting embodiment. The client 103 includes components such as a processor 104, an input device 108 (e.g., a keypad), a display 109, a memory 107, and a communications interface 106. Client 103 shows these components to communicate with each other through an internal bus 105. The server 101 includes components such as a processor 110, an input device 115, a display 114, a communications 113, and controllers 111, 112 which may be communicatively coupled through an internal bus 116. Controller A 111 may be dedicated to storing and retrieving tailoring information from a tailoring database DB 118. The tailoring database DB 118 may contain information regarding each tailored version of a web site, including design elements and functional information. Controller B 112 may be dedicated to storing and retrieving information from a usage database DB 119. The usage database DB 119 may contain information regarding usage patterns of individual users, analyses of collective user behaviors and preferences, accounting information, remuneration information, user profiles, and the like. The communications interfaces 106, 113 of the client and server communicate through an internet or World Wide Web.

Figure 9:
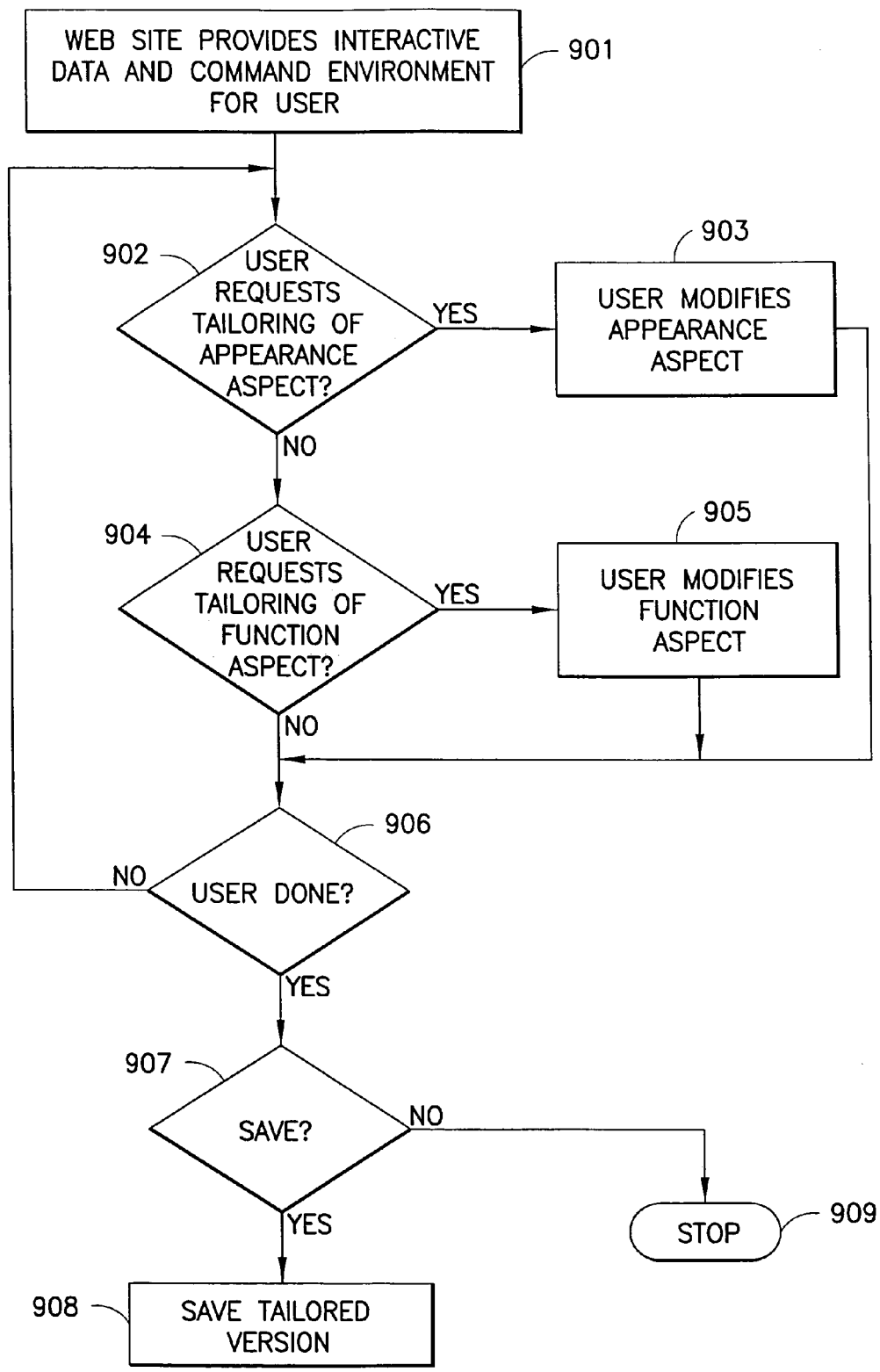
FIG. 9 is an embodiment of a method for modifying a web site by a user.

FIG. 9 illustrates an embodiment of a method for modifying a web site by a user. A plurality of information streams and request and command mechanisms used in the operation of the web site may be made available over the Web 102 in machine-readable or computer readable form, as shown in step 901 of FIG. 9. These mechanisms may include programmatic access 902, 903 to those information streams and request and command mechanisms in the object being modified or created for a site user creating or modifying an appearance of a tailored version of the website or a portlet or other design element. In order to facilitate the creation of a modified version of a web site, and of portlets and other design elements for use in modified versions, some embodiments of this invention include mechanisms to provide programmatic access, 904, 905 to various information streams and command and request channels involved in the function that the web site performs. These information streams and request and command mechanisms may be in a variety of formats, including, for example, eXtensible Markup Language (XML) syndication formats such as Rich Site Summary (RSS), Outline Processor Markup Language (OPML), Web Distributed Data eXchange (WDDX), Resource Description Framework (RDF), and Atom. Programmatic access to the information streams, such as, for example, search results, site news, weather reports, and the like, may be provided through mechanisms such as simple http transport (e.g., as used by the JavaScript® XmlHttpConnection object), and other mechanisms. These mechanisms allow users to create tailored versions of the web site by modifying the appearance and/or function of the entire web site or some functional subset of it (FIG. 5). For example, these modifications may range from relatively simple ones made available to inexperienced users, such as changing colors or type-faces, re-positioning design elements or windows on the page, scaling design elements and/or design content (e.g., for visually impaired users), or moving elements from page to page. More sophisticated users may be offered the ability to write their own style sheets (in, for example, the Cascading Style Sheet (CSS) language or JavaScrip®), their own HyperText Markup Language (HTML) templates, their own JavaScrip®) programs to be included on the modified pages, and the like. Users may be able to create their own design elements that may be put onto and moved between pages of the modified web site, including designing new portlets (Web-based design and functional elements that may request, receive, and display specialized information on a web site) with technologies such as the WebSphere™ Portal Server available from the assignee of this patent application. These modified versions of the web site may be created by various means, including interaction with the web site's customization mechanisms via a web-based front end through the browser, interaction with standard Web design tools and uploading the result to the web site, interaction with a special client program provided by the web site, and the like. At least some of the users who are offered the ability to modify the appearance and/or function of the web site 906 are also offered the ability to save their modifications 907, 908, typically, by giving the modified version of the web site a name by which it may later be accessed. If there is to be no save, processing of the method ceases to be performed 909.

Figure 7:
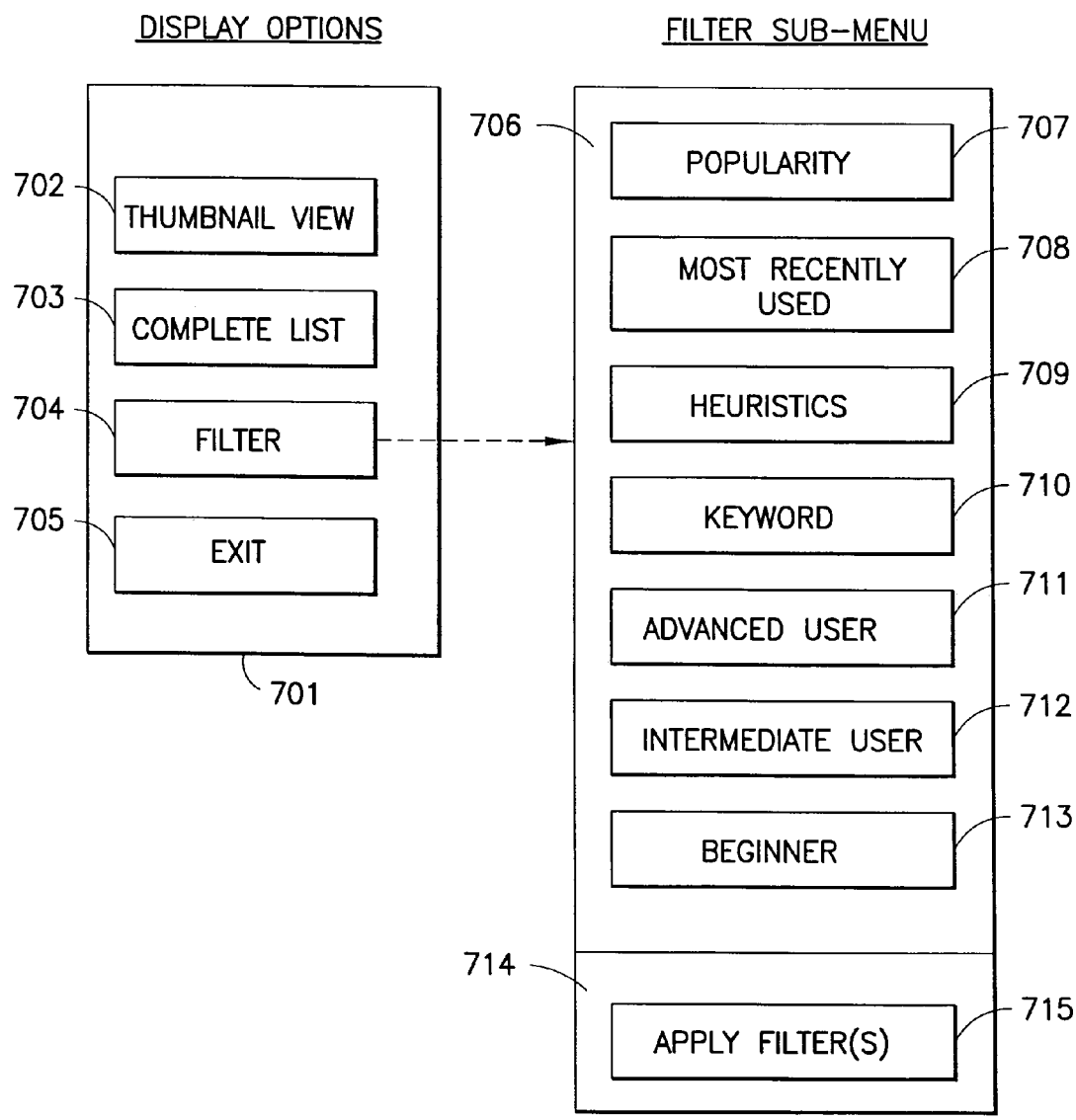
FIG. 7 is an embodiment of a method for selecting a tailored version of a web site by a user.

FIG. 7 illustrates an embodiment of a method of the present invention in which a user may access the tailored versions through a thumbnail presentation 702, a list of available tailored versions 703, or, through a narrowing down of candidates by the use of one or more filters 704. The present invention is well suited for providing a user with individually accessible tailored versions of a web site. In alternate embodiments, the modified versions of the web site may be made available by a variety of means, including merely allowing the user to see a list of the currently available modified versions, with their names and short descriptions, on a web page and selecting one to use, by ordering the available modified versions by popularity, by submitting natural language or key word queries, through behavioral heuristics of the user, by cookies, by manually input criteria (e.g., wish lists), by organizing the available modified versions into hierarchies by theme and style, by allowing the creator of the modified version and potentially other users to "tag" each modified version with ad-hoc textual tags and allowing users to search and browse the available modified versions according to the assigned tags, and the like. In FIG. 7, the web sites may be displayed as thumbnails such that a user may select a given web site by selecting the corresponding thumbnail by pressing a corresponding selection icon, such as a graphic button 702 from display option 701. In FIG. 7, the web sites may be displayed as a list, such as shown in FIG. 3. This list option may be selected by pressing a corresponding selection icon, such as graphic button 703. A filter system is also provided, such as through graphic button 704. Other graphic buttons, such as exit button 705, may be included. A filter sub-menu 706 may be displayed for a user to select one or more filters to narrow down a pool of tailored versions from tens, hundreds, or more, to a reasonable few. Possible filters include tailored version popularity 707, most recently used tailored versions 708, user behavioral heuristics 709, user entered keywords 710, user skill level 711, 712, and 713, and the like. Popularity may be determined through a rating scheme. If a rating scheme is used for ranking, the rating may be determined as a user average rating, a user median rating, an average of the middle percentage (e.g., 80%) of user ratings, a user average rating of what is determined to be a pool of similar users, an average of professional reviewers, or the like. Alternate embodiments of this invention may include online mechanisms to allow users to announce and discuss the modified versions of the web site and/or web site elements (the portlets or other design elements) that they have created and made available. Selection of filters may be accomplished in various alternate manners, including, as a non-limiting example, by checking and/or unchecking filter selection boxes in which case all selected filters are applied at once. Once a user has selected the desired filters, he or she may then apply the filter(s) 715, through an optionally demarcated window 714. These online mechanisms for announcement and/or discussion may include the abovementioned textual "tags", as well as discussion forums and comment threads and other discussion mechanisms known to the art, quality ratings of the available modified versions, and the like. In an embodiment, announcements may also be made through the transmission of email alerts to collaborative community members.

Figure 2:
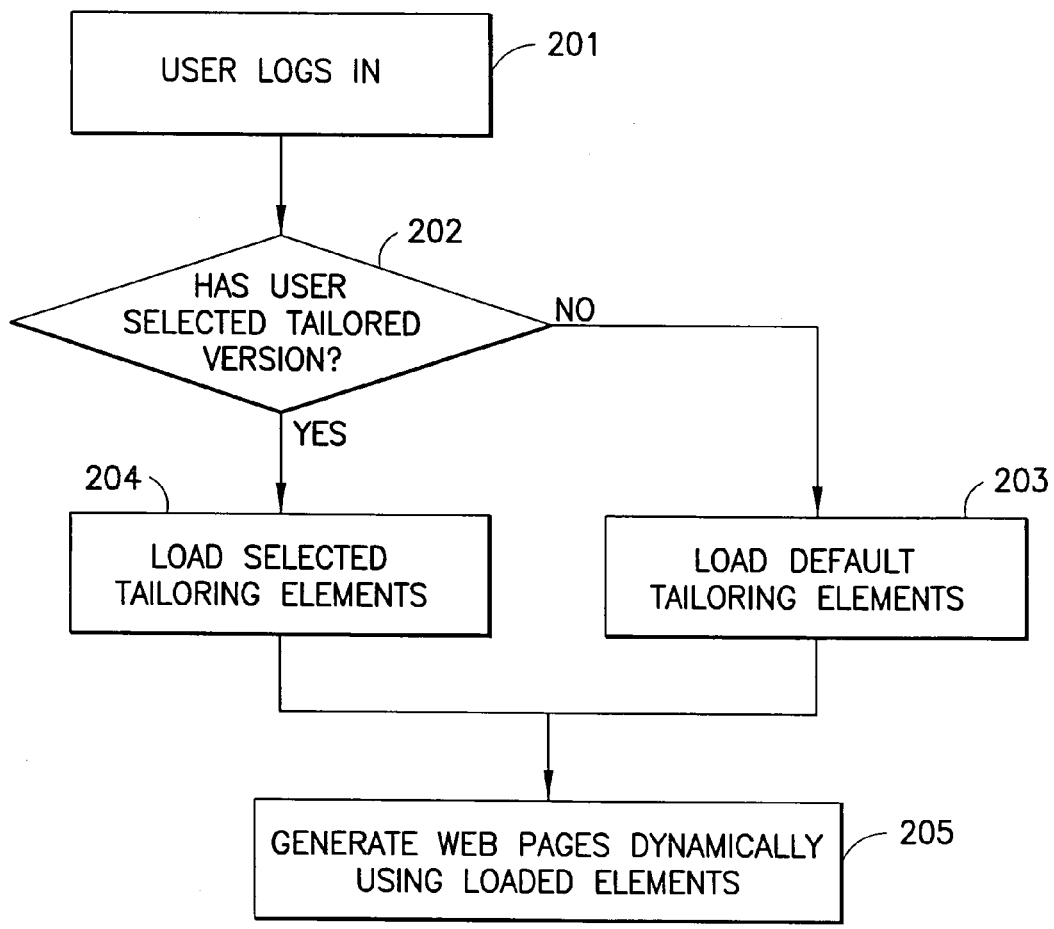
FIG. 2 is a flow diagram illustrating an embodiment of a method of the present invention.

FIG. 2 is a flow diagram illustrating the control flow of a method when a user logs into (identifies himself to) the web server 101 (e.g., by user name and password or access code) for the purpose of making use of the functions, such as purchasing goods, accessing information, and the like, that the web site provides. This method is preferably implemented through server side computer readable medium or other signal bearing medium tangibly embodying a program of machine-readable instructions capable of being executed or interpreted. At user entry step 201, the user logs into the website by providing a login name and password, biometric input, voice recognition, and/or other method, by which the system comes to know the identity (or at least the currently-claimed identity) of the user. The user's identity is then used at user selection decision step 202 to determine whether or not this user has in the past selected to use a particular tailored version of the site, as recorded in usage database DB 119. If the user has not done so, then at step 203 a set of default tailoring elements is loaded from the tailoring database DB 118. If the user has selected to use a particular tailored version of the site, then the tailoring elements corresponding to that version are loaded at load selection step 204 from the tailoring database DB 118. Generation step 205 then represents additional interactions between the user and the web site, in the course of which the tailoring elements loaded at either steps 203 or 204 are used to dynamically render web pages for the user. In this non-limiting embodiment of the invention, the tailoring elements include one or more of portlet definitions, page and portlet templates, cascading style sheets, and JavaScript programs. Other embodiments may make use of these and/or other suitable tailoring elements known to those of ordinary skill in the art.

Figure 8:
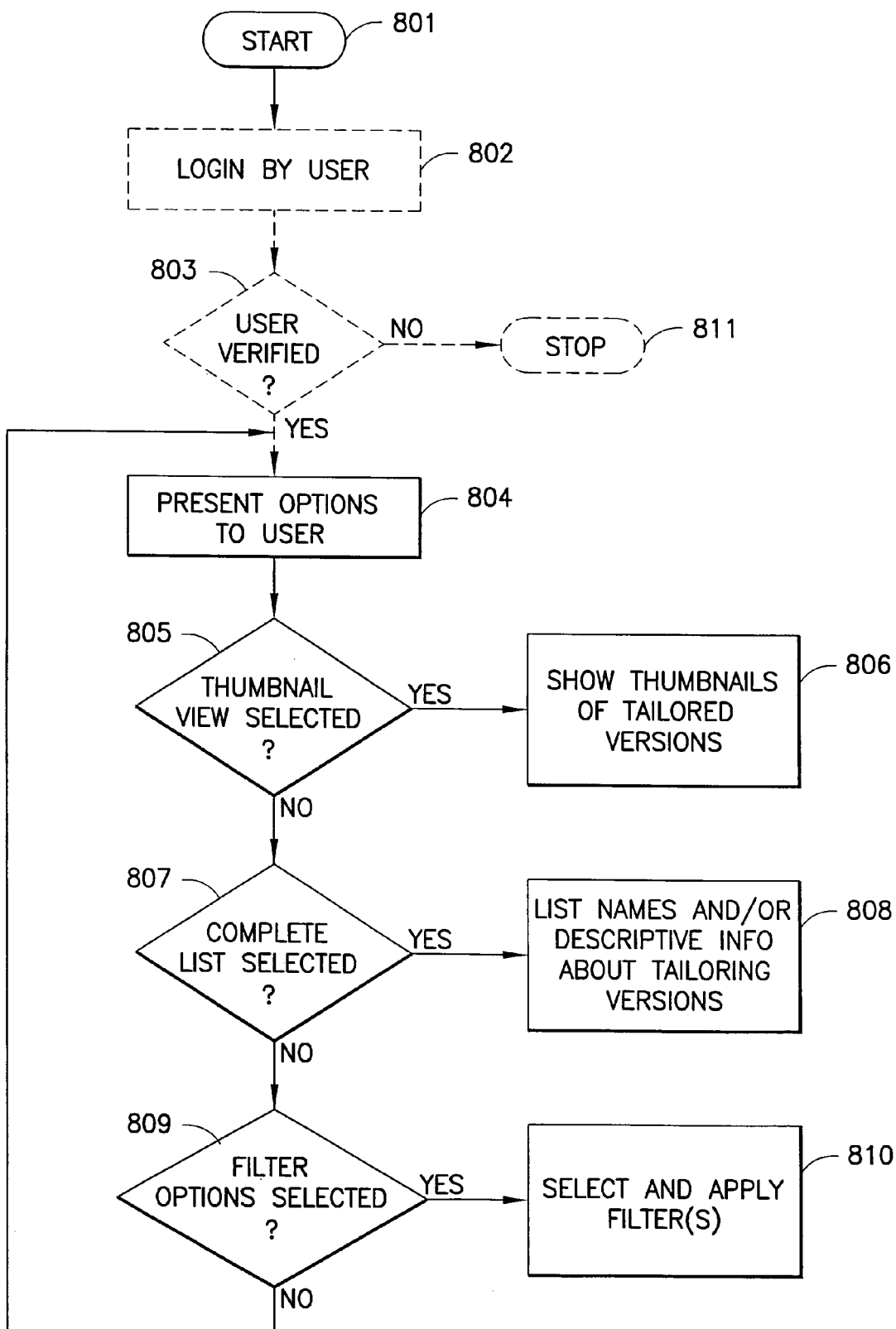
FIG. 8 is another embodiment of a method for selecting a tailored version of a web site by a user.

In an alternate embodiment, as shown in FIG. 8, a method for implementing a web site optionally, when starting 801, may first verify a user 802. If the user information is verified 803, the user is presented with a plurality of web site implementation options 804, such as via a menu to narrow down candidate tailored versions of the web site 706 or displaying thumbnail images of tailored versions of the web site 805, displaying a list of tailored versions 807, or filtering 809. If the user information is not verified, the execution of the method is stopped 811. In another alternative embodiment, the user may be immediately presented with the plurality of web site implementation options without verification; that is, the user may access the web site without identifying himself or herself and without a verification step. If the user selects the web site implementation option for providing thumbnail images of the available tailored versions of the website 805, up to a screen full of such thumbnail images may be displayed 806. If the user selects the web site implementation option for listing the names and/or descriptive information about the available tailored versions 807, a list may then appear 808. It is to be understood that the list or thumbnail image display may be multi-paged in which case scrolling may be implemented before a selection is made. At least one of the plurality of web site implementation options may be a filter or group of filters to present a subset of tailored versions of the web site 809. If the user selects one or more filters 810, these filters may be used to reduce the number of tailored versions of the web site to provide a subset of tailored versions of the web site to the user. Such filtering may reduce the number of tailored versions from tens or hundreds to a reasonable few. The user then may select one of the subset of tailored versions of the web site implementation. In the preferred embodiment, server side computer readable media or other signal bearing medium tangibly embodying a program of machine-readable instructions executable by a processor is preferably used to store the software or firmware code of the web site being tailored.

The present invention lends itself to remuneration of the web site owner(s). Making some aspects of, or utilities for, web site modification available for a fee (or as part of a premium site membership) to especially motivated or enthusiastic users may also serve as a revenue stream for the site. A mechanism may be provided for making some aspects of web site modification, and/or some utilities and/or sample programs for use in creating modified versions of the web site, available for a fee (e.g., through PayPal®), or available only to "premium" site members as an incentive to become a member. Embodiments of this invention may offer rewards, in the form of payment, increased site access, or other forms, to those users who create the most popular, or otherwise most beneficial, modified versions of the site or design elements for other users to use.

FIG. 3 is an exemplary and non-limiting example of a web page fragment used in an embodiment of this invention to present the user with a list of available tailored versions of a web site. The introductory text 301 explains the function of the page to the user. The graphic buttons 302 allow the user to sort the list 303 of available tailored versions of the web site by most recently modified, most popular, highest-rated according to user selected criteria, or the like. Alternatively, the graphic buttons 302 may allow filtering of the available tailored versions of the web site such that a subset of the tailored versions of the web site is presented to the user. Instead of buttons, options may be presented in other formats, such as in a menu or manually input data fields. The list 303 presents basic information about each available tailored version, and allows the user to access details about a version by clicking on its name. Numerous other possible layouts and detailed functions of such a page may be evident to those of ordinary skill in the art, including sorting the list by how highly-rated a version is by users with similar usage patterns to those of the current user as recorded in the database DB 105, or by sorting the list on the fly according to criteria input by a user to select another tailored web site version.

FIG. 4 is an exemplary and non-limiting example of a web page fragment used in an embodiment of this invention to present the user with descriptive information relating to a particular tailored version of a web site. The introductory text 401 explains the function of the page to the user. The information section 402 presents the user with basic information on the version as stored in the tailoring database DB 118 and links to other related information such as the profile of the author of the version and a description of the version's type. The functional section 403 allows the user to select this version of the web site for use, to express his opinion of this version by reporting a numerical rating, and to link to a discussion forum where users of the site discuss this version. Numerous other possible layouts and detailed functions of such a page may be evident to those of ordinary skill in the art.

FIG. 5 is an exemplary and non-limiting example of a web page fragment used in an embodiment of this invention to allow a user to create and modify tailored versions of the web site. The links on the page lead to other pages that enable specific tailoring tasks. A user is permitted to create a new version of a web site, define and modify web site pages, define and modify portlets (Web-based design and functional elements that may request, receive, and display specialized information on a web site), and work with style sheets. Numerous other possible layouts and detailed functions of such a page may be evident to those of ordinary skill in the art.

Figure 6:
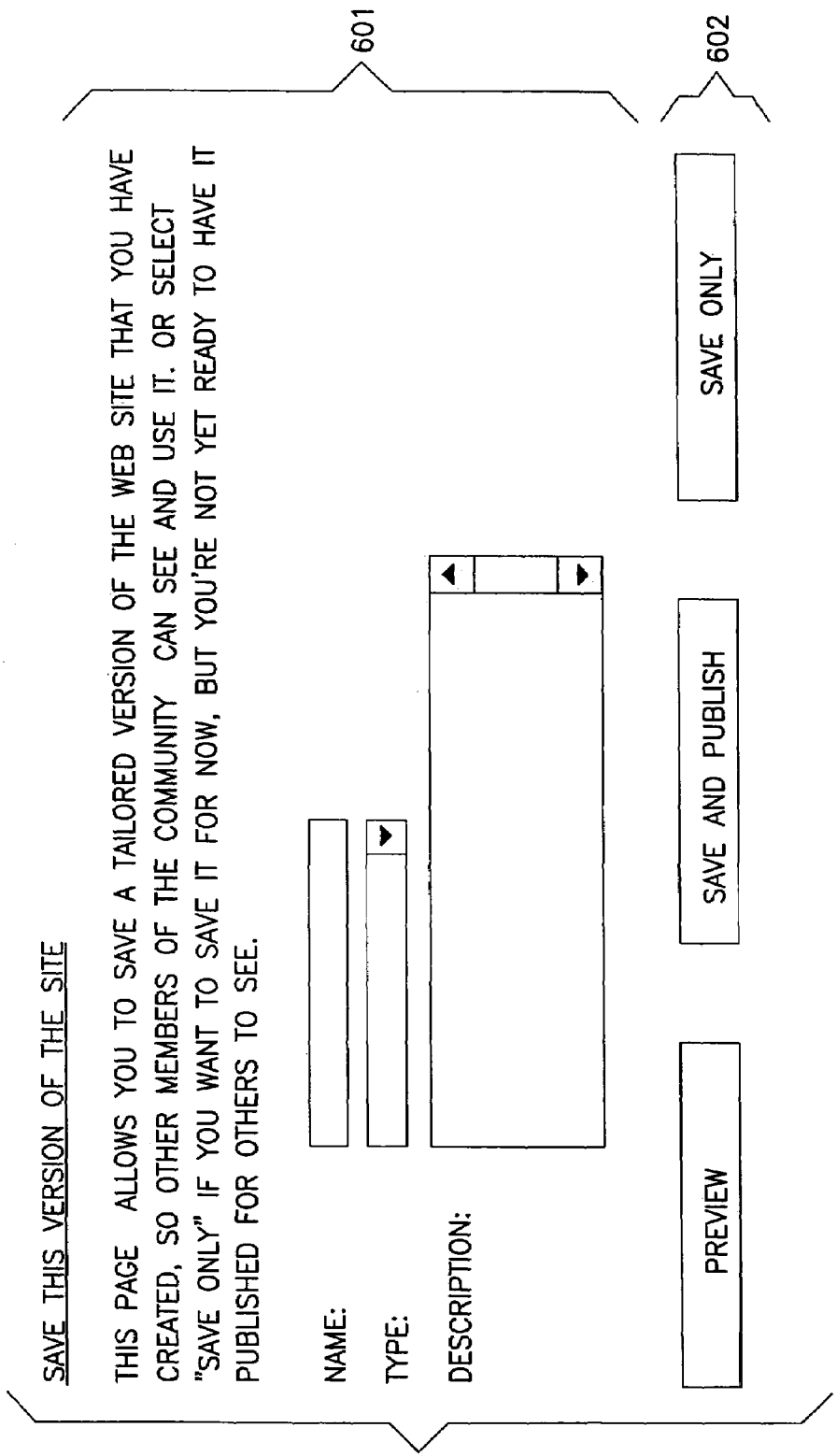
FIG. 6 is an embodiment of an exemplary web page fragment to allow a user to save a tailored version of the web site.

FIG. 6 is an exemplary and non-limiting example of a web page fragment used in an embodiment of this invention to allow a user to save a tailored version of the web site. The information area 601 allows the user to specify the name, type, and long description of the tailored version of the web site. The graphic buttons 602 allow the user to perform tasks such as viewing the information page about the version (as in FIG. 4) as it may appear once the version is saved, to save the version for others to use, and to save the version temporarily without publishing it for others. Numerous other possible layouts and detailed functions of such a page may be evident to those of ordinary skill in the art. For incidences where multiple users simultaneously tailor the same version of a web site, resolution determining software may reconcile the edits to form a unified version or lead to the automatic creation of alternative versions.

Alternate embodiments of this invention may include mechanisms to direct aid some users toward those modified versions of the web site that are most likely to appeal to them. For example, a web site may be programmed to determine usage patterns of each user (stored in usage DB 105) and recommend those modified versions that have proven most popular with other users whose usage patterns are similar. The authors of modified versions of the web site, and other users, may be permitted to mark each modified version of the web site according to the user type that the modified version is intended for. User type may be categorized in a variety of manners including skill level, personal style, cognitive style, sensory capabilities, and the like. Skill level may include "newcomer" (or beginner), "intermediate," and "power user" (or advanced). Cognitive style may include "visual learner" and "narrative." A user may be characterized through multiple user types. The version marks may be combined with user entered information, processor determined usage patterns by a user, self-descriptions entered into user profiles, and other information about each individual user to determine which modified versions of the website to recommend to that user.

Furthermore, alternate embodiments of this invention may allow the modifications created and shared by users in a collaborative community to be applied to multiple related web sites, so that if a user chooses to use a particular modified version of one of the web sites, the same or similar modifications may also apply, either automatically or manually selectably per a list of options, when that same user visits a related site.

In general, the various embodiments may be implemented in hardware or special purpose circuits, software, logic, or any combination thereof. For example, some aspects may be implemented in hardware, while other aspects may be implemented in firmware or software which may be executed by a processor, such as a controller, microprocessor or other computing device, although the invention is not limited thereto. While various aspects of the invention may be illustrated and described as block diagrams, flow charts, or using some other pictorial representation, it is will understood that these blocks, apparatus, systems, techniques or methods described herein may be implemented in, as non-limiting examples, hardware, software, firmware, special purpose circuits or logic, general purpose hardware or controller or other computing devices, or some combination thereof. In addition, it can be appreciated that the individual steps of the logic flow diagram of FIG. 2 may be viewed as well as interconnected functional blocks that are implemented in hardware, or as hardware and software.

Thus, the present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claims.

We claim:

1. A system for allowing collaborative user tailoring of websites, the system comprising:
   a usage database;
   a tailoring database;
   at least two client devices for a plurality of users each checking if a user has selected an existing tailored version of a website and, if the user has selected the existing tailored version of the website, then loading design elements of the existing tailored version of the website from the tailoring database to form the selected existing tailored version of the website and, otherwise, creating a tailored version of the website by loading a set of default tailoring design elements from the tailoring database to form the created tailored version of the website;
   the at least two client devices each modifying a functional organization of the user's version of the website through one of a plurality of selectable options, comprising a thumbnail view, and a complete list displayed on a graphical user interface of the corresponding client device, each of the two client devices modifying a function of at least one page of the website, forming another tailored version of the website, wherein the at least two client devices are each further creating a version of the website by permitting a user to define and modify web pages and portlets, where portlets are Web-based design elements that request, receive, and display specialized information on the website, wherein the tailoring database stores the another tailored version of the website, wherein each of the at least two client devices permits the user to selectively publish the another tailored version of the website, making the another tailored version of the website available to other users;
   for a plurality of site users, the at least two client devices each saving the tailored version of the website thus created or modified in the tailoring database;
   for the plurality of site users, the at least two client devices each accessing and making use of the tailored version of the website thus saved;
   wherein various tailored versions of the website which have been saved and made available are announced;
   where multiple tailored versions of the website are available;
   wherein at least one of the multiple tailored versions is a version of the website customized through an incorporation of functional elements through collaboration by the plurality of users,
   wherein information regarding user evaluations and ratings of the tailored versions are stored in the usage database,
   wherein each of the at least two client devices, after the user selects a tailored version, presents a plurality of website implementation options to a user on a graphical user interface of a client device, wherein the plurality of website implementation options comprises at least one filter, a thumbnail view, and a complete list displayed on a graphical user interface and permits modification of the tailoring database;
   wherein the tailoring database saves the modified implemented selected tailored version of the website as one of the plurality of tailored versions;
   wherein the at least one filter is based on one of user ratings of the tailored versions of the website, past user modifications, and user selected criteria.

2. A system as in claim 1, further comprising
   the at least two client devices creating or modifying at least one design element which is used within pages when creating the tailored versions of the website,
   to save the at least one design element thus created or modified, and
   to access and make use of the at least one design element thus saved in the creation or modifying of tailored versions of the website.

3. A system as in claim 1, wherein the at least two client devices each selects, in correspondence to at least one particular user of the website, a particular subset of the tailored versions of the website thus saved.

4. A system as in claim 3, wherein the at least two client devices each selects, in correspondence to at least that particular user of the website, the tailored versions of the website contained in that selected subset.

5. A system as in claim 4 where the subset of tailored versions recommended to that particular user or users is selected by the usage database responsive to a recorded usage pattern of that particular user.

6. A system as in claim 4 where the subset of tailored versions recommended to that particular user is selected by the usage database responsive to a user profile as stored in the system.

7. A systems as in claim 1, wherein a plurality of site users pay a fee for access to at least one of create and modify tailored versions of the website.

8. A system as in claim 1, wherein creating and modifying tailored versions of the website are available only to a website's user who is in a premium subset of users.

9. A system as in claim 1, wherein individual one of the plurality of users who at least one of create and modify tailored versions of the website receive compensation.

10. A system as in claim 1 wherein users assign textual tags to selected ones of the tailored versions.

11. A system as in claim 1, wherein an author of a tailored version of the website is permitted to assign a version mark according to a user type for that author's tailored version of the website.

12. A system as in claim 11, wherein the user type is one of skill level, personal style, cognitive style, and sensory capabilities.

13. A system as in claim 11, the version mark is combinable with user entered information, processor determined usage patterns of a user, and self-descriptions entered into user profiles.

* * * * *